(12) United States Patent
Sato

(10) Patent No.: US 8,081,557 B2
(45) Date of Patent: Dec. 20, 2011

(54) OPTICAL PICKUP APPARATUS

(75) Inventor: Minoru Sato, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 12/748,218

(22) Filed: Mar. 26, 2010

(65) Prior Publication Data

US 2010/0246369 A1    Sep. 30, 2010

(30) Foreign Application Priority Data

Mar. 30, 2009 (JP) ................................. 2009-082062

(51) Int. Cl.
*G11B 7/00* (2006.01)
(52) U.S. Cl. .......... 369/112.23; 369/112.01; 369/112.16
(58) Field of Classification Search ............... 369/44.23, 369/44.37, 110.01, 112.01, 112.05, 112.16, 369/112.19, 112.23, 112.29
See application file for complete search history.

(56) References Cited

U.S. PATENT DOCUMENTS

| | | | | |
|---|---|---|---|---|
| 4,965,780 A | * | 10/1990 | Lee et al. ..................... | 369/13.3 |
| 5,307,335 A | * | 4/1994 | Komiya ..................... | 369/112.19 |
| 5,657,305 A | * | 8/1997 | Sasaki et al. ............. | 369/112.19 |
| 2006/0098552 A1 | * | 5/2006 | Kawamura et al. ...... | 369/112.01 |

FOREIGN PATENT DOCUMENTS

JP    2008-251112    10/2008

\* cited by examiner

*Primary Examiner* — Wayne Young
*Assistant Examiner* — Brenda Bernardi
(74) *Attorney, Agent, or Firm* — SoCal IP Law Group LLP; Steven C. Sereboff; John E. Gunther

(57) ABSTRACT

An optical pickup apparatus comprising: a laser light source; an objective lens; a reflection mirror; a photodetector; and a beam splitter, the beam splitter including a first reflective film configured to generate a first phase difference corresponding to a predetermined wavelength with respect to laser light, the reflection mirror including a second reflective film configured to generate a second phase difference corresponding to the predetermined wavelength with respect to the laser light, the first reflective film and the second reflective film being formed so that a combined phase difference of the first phase difference and the second phase difference becomes substantially quarter-wave with respect to the laser light.

15 Claims, 5 Drawing Sheets

| WAVELENGTH | PHASE DIFFERENCE BY REFLECTIVE LAYER OF BEAM SPLITTER | PHASE DIFFERENCE BY REFLECTIVE LAYER OF REFLECTION MIRROR FOR RAISING | COMBINED PHASE DIFFERENCE |
|---|---|---|---|
| 660nm | 17.80(deg) | −107.80(deg) | −90.00(deg) |
| 784nm | 34.26(deg) | −124.26(deg) | −90.00(deg) |

FIG. 4

OPTICAL PICKUP APPARATUS

CROSS-REFERENCE TO RELATED APPLICATION

This application claims the benefit of priority to Japanese Patent Application No. 2009-082062, filed Mar. 30, 2009, of which full contents are incorporated herein by reference.

BACKGROUND OF THE INVENTION

1. Field of the Invention

The present invention relates to an optical pickup apparatus configured to guide first laser light and second laser light having different wavelengths to an objective lens by refracting optical axes by a reflection mirror through a common optical path and to apply the laser light to an optical recording medium, in which the first laser light and the second laser light, which are linear polarization emitted from each of a first laser light source and a second laser light source, are applied to the recording medium as the first laser light and the second laser light of circular polarization.

2. Description of the Related Art

In an optical pickup apparatus used for optically recording/reproducing signals with the use of laser light to an optical recording medium such as an optical disc including DVD (Digital Versatile Disc) and CD (Compact Disc), there is known an optical pickup apparatus which supports DVD and CD with different recording densities with a single optical pickup apparatus.

Such an optical pickup apparatus compatible with DVD and CD includes a first laser light source emitting laser light of 645 nm to 675 nm in a red wavelength band suitable for DVD and also includes a second laser light source emitting laser light of 765 nm to 805 nm in an infrared wavelength band suitable for CD, and the laser light to be used is switched according to an optical disc.

The first laser light source and the second laser light source generally include a semiconductor laser of laser diode, respectively, and a multi laser unit is often employed in which each laser light source includes a single laser chip, or laser light sources include respective laser chips and are installed on the same semiconductor base so as to be incorporated in a single package.

Also, in the optical pickup apparatus compatible with DVD and CD, an objective lens in which an annular diffraction grating is formed on an incident face is used, and a quality of each laser light applied to each optical disc is ensured by correcting spherical aberration with respect to each optical disc of DVD and CD by diffracting each laser light having a wavelength suitable for each optical disc with this diffraction grating so as to correspond to DVD and CD by a single objective lens.

The optical pickup apparatus compatible with DVD and CD has its optical path simplified by employing the above-mentioned multi laser unit and a single objective lens.

In an optical pickup apparatus, in order to alleviate a bad influence caused by double refraction of a transparent substrate resin of the optical disc, laser light applied onto a signal layer of the optical disc is made circular polarization.

A semiconductor laser, which is a laser light source of the optical pickup apparatus used for recording/reproduction of the optical disc, emits laser light of linear polarization due to its structure, so that the optical pickup apparatus needs a quarter-wave plate for generating a phase difference of quarter-wave to the laser light emitted from the laser light source in order to make the laser light to be applied to the optical disc circular polarization.

Also, since the optical pickup apparatus can make a linear polarization directions of laser light different by 90 degrees between an outward path for guiding the laser light from the laser light source to the optical disc and a return path for guiding the laser light reflected by the optical disc to a photodetector by a quarter-wave plate, the laser light source and the photodetector can be arranged in different optical paths with high utilization efficiency by using a polarizing beam splitter.

In an optical pickup apparatus in which two sets of laser light sources with different wavelengths compatible with DVD and CD are provided, and each laser light emitted from each laser light source is guided to a common optical path and made to correspond to each optical disc through a common objective lens, there is known a configuration that a reflection mirror for raising arranged in front of the objective lens on the outward path is given a function of the quarter-wave plate, and laser light with each wavelength compatible with DVD and CD is made circular polarization and applied to the optical disc (See Japanese Patent Application Laid-Open Publication No. 2008-251112).

In the optical pickup apparatus disclosed in Japanese Patent Application Laid-Open Publication No. 2008-251112, since the raising reflection mirror is given the function of the quarter-wave plate, the number of optical components is decreased, which is advantageous in the number of assembling processes and miniaturization, but a phase difference of a quarter-wave needs to be generated to the laser light with each wavelength compatible with DVD and CD by the raising reflection mirror. Thus, the raising reflection mirror needs to be given a phase difference function of a quarter-wave plate in a wide band corresponding to the laser light with each wavelength compatible with DVD and CD. Since it is difficult to form a reflective film capable of both reflectivity of the reflection mirror and the phase difference function or it is necessary to provide a phase difference film of the quarter-wave plate in a wide band through bonding not by coating on a reflection surface of the reflection mirror, it is disadvantageous in terms of cost.

SUMMARY OF THE INVENTION

An optical pickup apparatus comprising: a laser light source configured to emit laser light having a predetermined wavelength; an objective lens configured to apply the laser light to an optical recording medium; a reflection mirror interposed in a optical path between the laser light source and the objective lens, the reflection mirror configured to reflect the laser light so that the laser light is allowed to be incident on the objective lens; a photodetector configured to receive reflected light obtained by reflecting the laser light from the optical recording medium; and a beam splitter interposed in a optical path between the laser light source and the reflection mirror, and arranged so that the laser light is reflected from the beam splitter in a direction of the reflection mirror, and the reflected light is allowed to pass through the beam splitter in a direction of the photodetector, the beam splitter including a first reflective film configured to generate a first phase difference corresponding to the predetermined wavelength with respect to the laser light, the reflection mirror including a second reflective film configured to generate a second phase difference corresponding to the predetermined wavelength with respect to the laser light, the first reflective film and the second reflective film being formed so that a combined phase difference of the first phase difference and the second phase difference becomes substantially quarter-wave with respect to the laser light emitted from the laser light source.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 4 is an explanatory diagram illustrating a table for explaining a phase difference generated in a reflective film of a beam splitter and a reflective film of a raising reflection mirror, respectively.

DETAILED DESCRIPTION OF THE INVENTION

Figure 1:
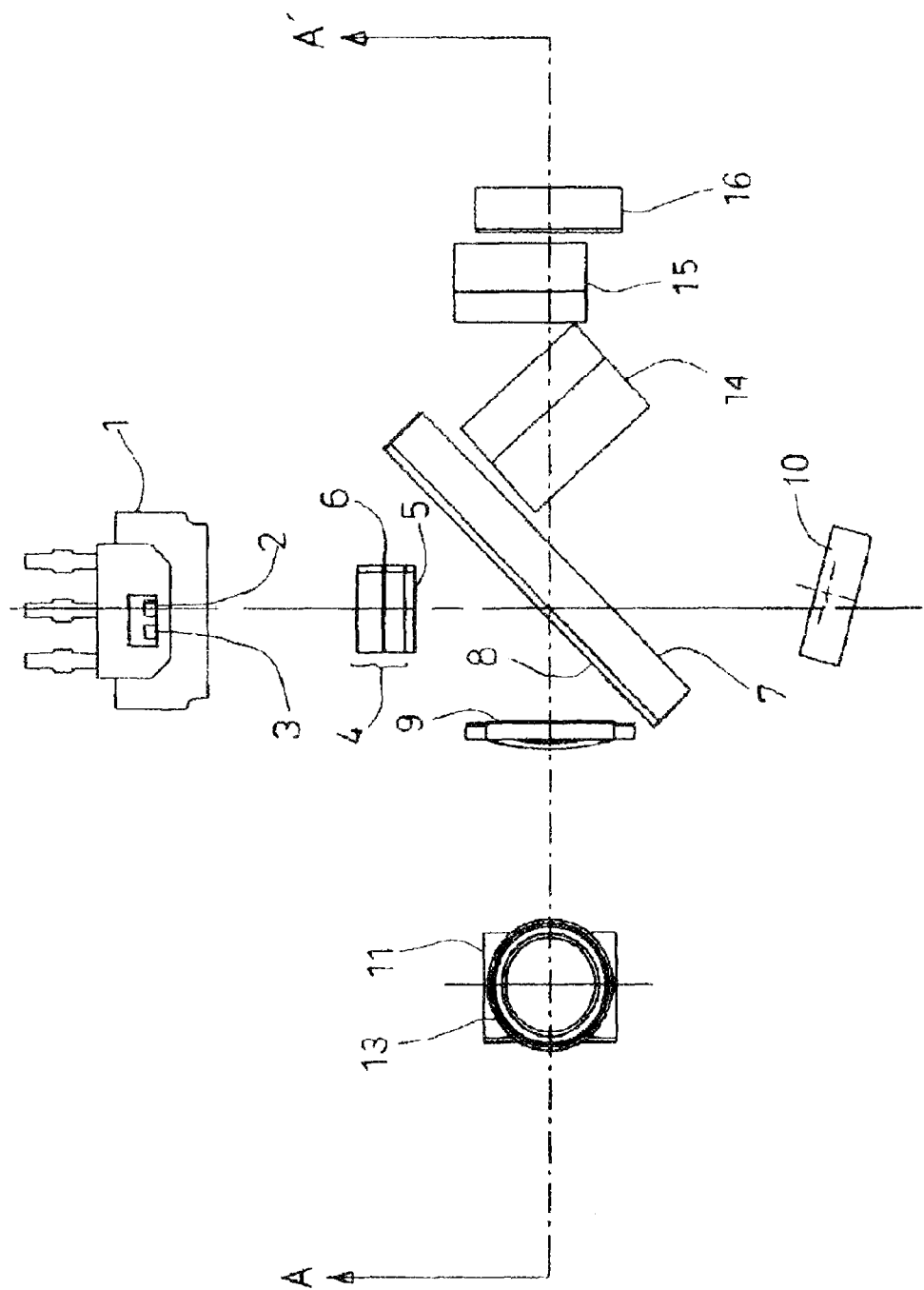
FIG. 1 is an optical arrangement diagram illustrating a plane of an example of an optical system in an optical pickup apparatus according to an embodiment of the present invention.
Figure 2:
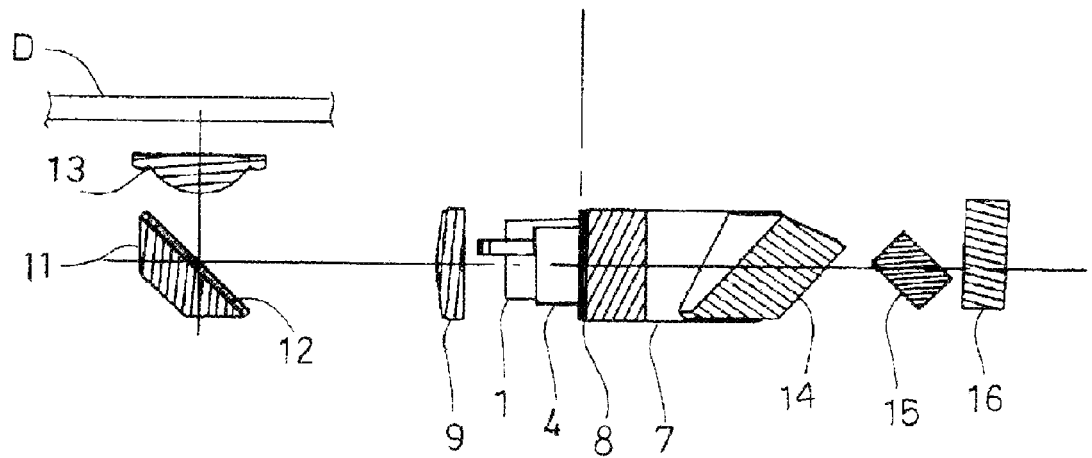
FIG. 2 is an optical arrangement diagram illustrating a section taken along A-A' of FIG. 1.

At least the following details will become apparent from descriptions of this specification and of the accompanying drawings.

An optical pickup apparatus according to an embodiment of the present invention includes a first laser light source and a second laser light source respectively emitting first laser light with a first wavelength and second laser light with a second wavelength, whose wavelengths are different from each other, the first laser light and the second laser light whose optical axes are refracted by a reflection mirror through a common optical path are guided to an objective lens, and the first laser light and the second laser light are applied to an optical recording medium, in which a beam splitter is provided for branching the first laser light source, the second laser light source, and a photodetector respectively receiving the first laser light and the second laser light reflected by the optical recording medium into different optical paths in the common optical path of the first laser light and the second laser light, the first laser light source and the second laser light source are arranged on the reflection surface side of the beam splitter so as to generate a phase difference according to the laser wavelength in the first laser light and the second laser light by a reflective film of the beam splitter, respectively, while a phase difference according to the laser wavelength is generated in the first laser light and the second laser light respectively by a reflective film formed in the reflection mirror, and a phase difference of substantially quarter-wave is generated in the first laser light and the second laser light respectively by the respective phase differences of the first laser light and the second laser light generated by the reflective film of the beam splitter and the respective phase differences of the first laser light and the second laser light generated by the reflective film of the reflection mirror.

Also, in the optical pickup apparatus according to an embodiment of the present invention, the first laser light source and the second laser light source are provided in a multi laser unit incorporated in a single package.

Also, in the optical pickup apparatus according to an embodiment of the present invention, a front monitor light-receiving detector is arranged for receiving the first laser light and the second laser light emitted from the first laser light source and the second laser light source respectively and allowed to pass through the beam splitter, and a light-receiving output corresponding to each laser light amount of the first laser light and the second laser light is generated by the front monitor light-receiving detector.

Also, in the optical pickup apparatus according to an embodiment of the present invention, based on the respective phase differences of the first laser light and the second laser light generated by the reflective film of the beam splitter, a phase difference generated in the first laser light and the second laser light is set by the reflective film of the reflection mirror so as to allow the respective phase differences of the first laser light and the second laser light reaching the optical recording medium to be an substantially quarter-wave, respectively, with respect to the first laser light and the second laser light emitted from the first laser light source and the second laser light source, respectively.

Also, in the optical pickup apparatus according to an embodiment of the present invention, linear polarization directions of the first laser light and the second laser light incident to the beam splitter are set at substantially 45 degrees with respect to an inclination direction of a reflection surface of the beam splitter, longitudinal directions of elliptic polarization of the first laser light and the second laser light incident to the reflection mirror are set at substantially 45 degrees with respect to the inclination direction of the reflection mirror, and directions of the reflection surface of the beam splitter and the reflection surface of the reflection mirror are set so that the optical axis of the laser light incident to the beam splitter and the optical axis of the laser light emitted from the reflection mirror are substantially orthogonal to each other.

In the optical pickup apparatus according to an embodiment of the present invention, the setting of the phase difference to each laser wavelength of the first laser light and the second laser light can be adjusted by both the reflective film of the beam splitter and the reflective film of the reflection mirror, and there is an advantage that the phase difference can be easily set to the quarter-wave with respect to each laser wavelength.

In this case, based on the respective phase differences of the first laser light and the second laser light generated by the reflective film of the beam splitter, the phase differences generated in the first laser light and the second laser light are set by the reflective film of the reflection mirror so as to be an substantially quarter-wave, respectively, so that the reflective film of the beam splitter can be formed by giving priority to the original optical-path branching function as the beam splitter, which is advantageous in setting a laser light amount ratio of the branched optical paths at a desired design value.

Also, an optical layout configured such that the first laser light and the second laser light are reflected by the reflective film of the beam splitter is facilitated by the use of the multi laser unit as the first laser light source and the second laser light source.

Also, by arranging the front monitor light-receiving detector so that the first laser light and the second laser light pass through the beam splitter and are received by the front monitor light-receiving detector, the single front monitor light-receiving detector can be used both for the first laser light and the second laser light, and an efficient optical layout is realized.

Moreover, since the directions of the reflection surface of the beam splitter and the reflection surface of the reflection mirror are set so that the linear polarization directions of the first laser light and the second laser light incident to the beam splitter are set at substantially 45 degrees with respect to the inclination direction of the reflection surface of the beam splitter, the longitudinal directions of the elliptic polarization of the first laser light and the second laser light incident to the reflection mirror are set at substantially 45 degrees with respect to the inclination direction of the reflection surface of the reflection mirror, and the optical axis of the laser light incident to the beam splitter and the optical axis of the laser light emitted from the reflection mirror are substantially orthogonal to each other, the phase difference of the first laser light and the second laser light in the reflective film of the beam splitter and the reflective film of the reflection mirror can be generated efficiently, and also, an optical layout advantageous for reducing the thickness can be achieved.

An optical pickup apparatus according to an embodiment of the present invention will be described below in detail referring to the drawings.

An illustrated optical pickup apparatus is configured to correspond to recording/reproduction of DVD and also to recording/reproduction of CD. As a laser unit, the first laser light source 2 is chosen when using CD as an optical recording medium, and the second laser light source 3 is chosen when using DVD as an optical recording medium.

A laser unit 1 has a first laser light source 2 that emits first laser light having a first wavelength of 645 nm to 675 nm, for example, 660 nm, in a red wavelength band suitable for DVD, and a second laser light source 3 that emits second laser light having a second wavelength of 765 nm to 805 nm, for example, 784 nm, in an infrared wavelength band suitable for CD, in which the first laser light source 2 and the second laser light source 3 are formed on the same semiconductor substrate by laser diodes, respectively, so that the laser unit 1 is configured as a so-called multi laser unit that emits laser light having two wavelengths suitable for CD recording/reproduction and DVD recording/reproduction.

Each laser light selectively emitted from the first laser light source 2 and the second laser light source 3 of the laser unit 1 respectively is incident on a complex optical element 4. The complex optical element 4 includes a diffraction grating 5 having a diffraction action effective for each laser wavelength of the laser lights generated from the first laser light source 2 and the second laser light source 3, respectively, and separates each laser light to three beams of 0th order diffraction light beam and ±1st order diffraction light beams.

Also, the complex optical element 4 includes a half-wave plate 6 and has a function to suppress return light returning to the laser unit 1.

The laser light having passed through the complex optical element 4 is reflected by a reflective film 8 of a plate-type beam splitter 7 arranged with inclination of 45 degrees with respect to the laser light and is incident on a collimating lens 9. The beam splitter 7 allows a part of the laser light having passed through the complex optical element 4 to pass therethrough by the film characteristic of the reflective film 8 and to be guided to a front monitor light-receiving detector 10, and also allows the remaining laser light which does not pass therethrough to be reflected and guided to a major optical path.

The reflective film 8 of the beam splitter 7 is formed by a semi-transmissive mirror or a polarization filter and distributes a reflected laser light amount and a transmitted laser light amount with a predetermined ratio of laser light amounts by the film characteristics of the reflective film 8.

If there is an allowance in the laser light amount of each laser light generated from the first laser light source 2 and the second laser light source 3, respectively, of the laser unit 1, the semi-transmissive mirror can be employed as the reflective film 8, design and formation of the reflective film 8 is easy, and cost reduction of the beam splitter 7 can be achieved. In this case, there is no need to allow the reflected laser light amount to be equal to the transmitted laser amount, in the semi-transmissive mirror characteristic of the reflective film 8 and the setting is performed in consideration of the laser light amount reaching the optical disc and the laser light amount received into a photodetector 16 which will be described later.

On the other hand, if it is necessary to efficiently use the laser light amount of each laser light generated from the first laser light source 2 and the second laser light source 3, respectively, of the laser unit 1, a polarization filter is employed as the reflective film 8. In this case, for example, the first laser light and the second laser light are allowed to be incident on the beam splitter 7 in s polarization, the reflective film 8 of the polarization filter in the beam splitter 7 allows only a slight part, that is, several %, for example, of the laser light of the s polarization to be incident thereon and guides it to the front monitor light-receiving detector 10, and most of the laser light, that is, 90% or more, for example, of the laser light are allowed to be reflected and guided to the major optical path.

The collimating lens 9 allows the laser light having a wavelength suitable for DVD to be parallel light and narrows a spread angle of the laser light having a wavelength suitable for CD. The laser light having passed through the collimating lens 9 is reflected by a reflective film 12 of a raising reflection mirror 11 to refract the optical axis of the laser light, the optical axis becomes substantially perpendicular to the optical axis of each laser light emitted from the laser unit 1 and the optical axis of reflected light from a disc D received by the photodetector 16, and the laser light is incident on an objective lens 13.

The objective lens 13 has an annular diffraction structure formed around the optical axis on the incident face and corresponds to two wavelengths designed such that diffracted light with a predetermined order is collected after correcting spherical aberration appropriately with respect to a thickness of a transparent substrate layer of each optical disc D of DVD and CD by a diffraction function of the diffraction structure. For example, NA (Numerical Aperture) to the laser light having a wavelength suitable for DVD is designed at 0.65, and NA to the laser light having a wavelength suitable for CD is designed at 0.51, respectively.

Therefore, the laser light having a wavelength suitable for DVD from the first laser light source 2 is collected by the objective lens 13 so as to fit the thickness of the transparent substrate layer of DVD and applied to a signal layer of the DVD, while the laser light having a wavelength suitable for CD from the second laser light source 3 is collected by the objective lens 13 so as to fit the thickness of the transparent substrate layer of CD and applied to the signal layer of the CD.

The laser light having a wavelength suitable for DVD and the laser light having a wavelength suitable for CD, which are generated from the first laser light source 2 and the second laser light source 3, respectively, of the laser unit 1 by the above optical system, are allowed to be incident on the single objective lens 13, and the laser light is focused on the signal layer of the optical disc D of DVD or CD and applied so as to be followed by a predetermined signal track by driving the objective lens 13 in a focusing direction and a tracking direction.

A phase difference according to a laser wavelength is generated in the first laser light and the second laser light reflected by the reflective film 8 of the beam splitter 7, respectively, and a phase difference according to the laser wavelength is generated in the first laser light and the second laser light reflected by the reflective film 12 of the raising reflection mirror 11, respectively. The phase characteristics of each of the reflective film 8 of the beam splitter 7 and the reflective film 12 of the reflection mirror 11 are set so that respective phase differences of the first laser light and the second laser light are combined by the phase difference generated by the reflective film 8 of the beam splitter 7 and the phase difference generated by the reflective film 12 of the reflection mirror 11 so as to become an substantially quarter-wave, respectively. Therefore, both the first laser light and the second laser light applied to the optical disc D are circular polarization.

The laser light applied to the signal layer of the optical disc D is modulated and reflected by the signal layer, returned to the objective lens 12, returned to the optical path having been traveled in the opposite direction, and reaches the beam splitter 7. The laser light returned to the beam splitter 7 passes through the beam splitter 7, and then, passes through a first plate 14 giving astigmatism that becomes a focus error component of the laser light applied to the optical disc D, and are guided to the photodetector 16 through a second plate 15 arranged with inclination so that the harmful astigmatism generated while passing through the beam splitter 7 is corrected.

Here, when the reflective film 8 of the beam splitter 7 is a semi-transmissive mirror, the laser light reaching the photodetector 16 has a larger loss returning to the laser unit 1 side, but a laser light amount which does not matter practically is ensured by the size of each laser light amount emitted from the first laser light source 2 and the second laser light source 3, optical path loss, and light-receiving sensitivity of the photodetector 16. Moreover, in this case, the return light to the laser unit 1 is suppressed by the complex optical element 4, and an increase of a noise in the first laser light and the second laser light is prevented.

On the other hand, when the reflective film 8 of the beam splitter 7 is a polarization filter, the laser light reaching the reflective film 8 is reflected twice by the reflective film 12 of the raising reflection mirror 11 on the outward path and the return path to/from the optical disc D and also reflected once by the reflective film 8 on the outward path. Thus, only a phase difference generated by allowing the first and the second laser lights to be reflected by the reflective film 8 is insufficient in order to rotate the linear polarization directions of the first laser light and the second laser light 90 degrees on the outward path and the return path, however, the laser light which was linear polarization of the s polarization on the outward path to the optical disc D becomes elliptic polarization containing a large amount of p polarization components on the return path and is incident on the reflective film 8. When the reflective film 8 of the beam splitter 7 has a film characteristic that most of the p polarization laser light (90% or more) is transmitted, in the elliptic polarization laser light containing a large amount of the p polarization components having returned to the beam splitter 7, a laser light amount lost in reflection by the reflective film 8 is suppressed, and much of the laser light amount passes through the reflective film 8 and reaches the photodetector 16.

Figure 3:
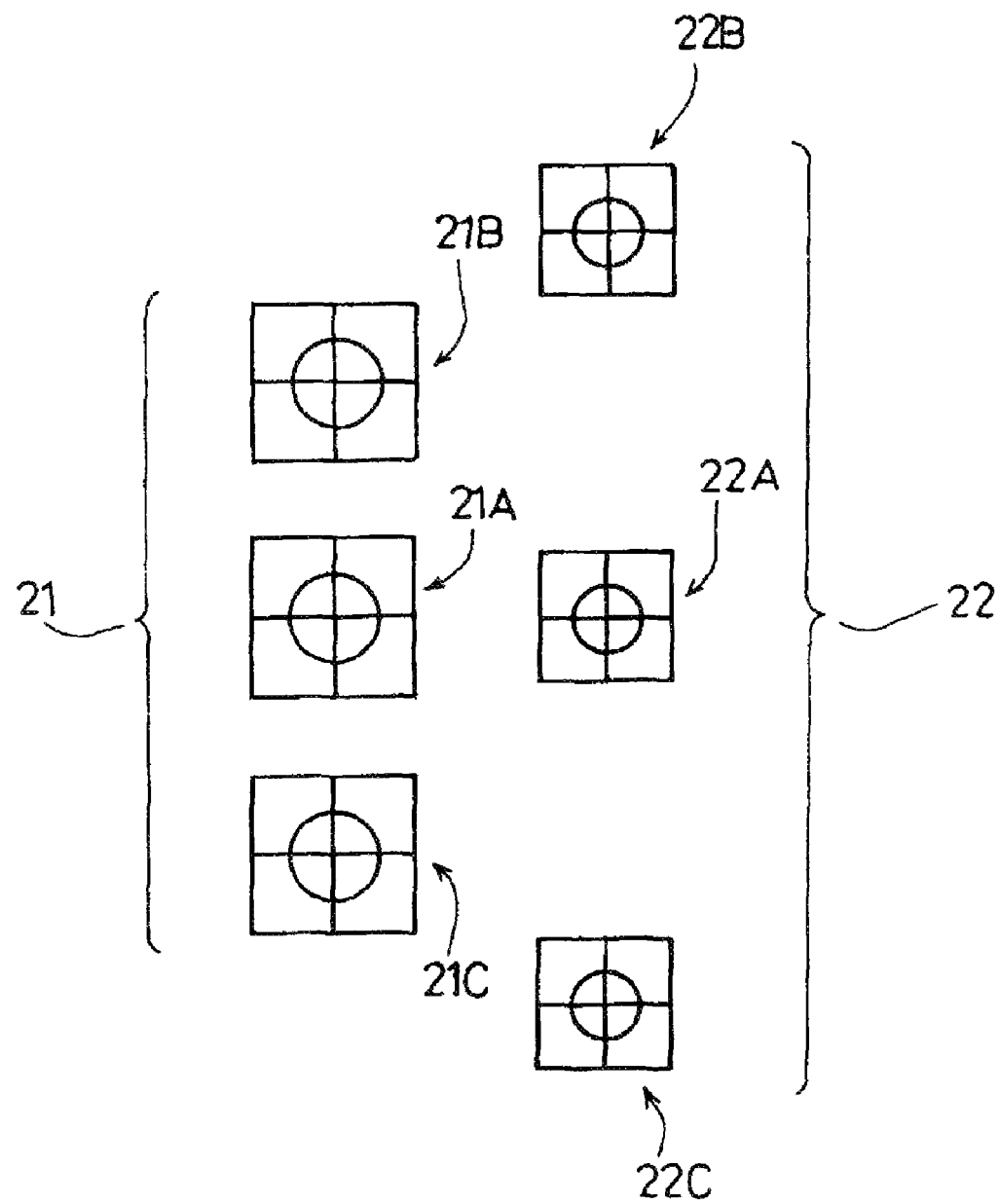
FIG. 3 is an explanatory diagram for explaining each light-receiving portion of a DVD light-receiving area and a CD light-receiving area of a photodetector.

In the photodetector 16, as shown in FIG. 3, a DVD light-receiving area 21 used for recoding/reproduction of DVD and a CD light-receiving area 22 used for recording/reproduction of CD are formed side by side on the same light-receiving surface. In the DVD light-receiving area 21, a main light-receiving portion 21A, a front sub light-receiving portion 21B, and a rear sub light-receiving portion 21C are formed corresponding to three beams of the laser light having a wavelength suitable for DVD, that is, a main beam of 0th order diffraction light and a front sub beam and a rear sub beam of ±1st order diffraction light arranged on the front and rear of the main beam, respectively. In the CD light-receiving area 22, a main light-receiving portion 22A, a front sub light-receiving portion 22B, and a rear sub light-receiving portion 22C are formed corresponding to three beams of the laser light having a wavelength suitable for CD, that is, a main beam of 0st order diffraction light and a front sub beam and a rear sub beam of ±1st order diffraction light arranged on the front and rear of the main beam, respectively.

A distance between each light-receiving portion in the DVD light-receiving area 21 corresponds to an interval between each light spot of the three beams on a signal face of the DVD, while a distance between each light-receiving portion in the CD light-receiving area 22 corresponds to an interval between each light spot of the three beams on a signal face of the CD.

In the photodetector 16, each of the main light-receiving portion 21A, the front sub light-receiving portion 21B, and the rear sub light-receiving portion 21C of the DVD light-receiving area 21 and the main light-receiving portion 22A, the front sub light-receiving portion 22B, and the rear sub light-receiving portion 22C of the CD light-receiving area 22 respectively includes four segments having been divided in quarters in the cross state. In the main light-receiving portion 21A, the front sub light-receiving portion 21B, and the rear sub light-receiving portion 21C of the DVD light-receiving area 21, a light-receiving spot containing an effective focus error component and a tracking error component is received with respect to a direction of division lines of each light-receiving portion when the first laser light emitted from the laser unit 1 is applied to the optical disc, while in the main light-receiving portion 22A, the front sub light-receiving portion 22B, and the rear sub light-receiving portion 22C of the CD light-receiving area 22, a light-receiving spot containing an effective focus error component and a tracking error component is received with respect to a direction of division lines of each light-receiving portion when the second laser light emitted from the laser unit 1 is applied to the optical disc.

Therefore, since an operation is carried out for each light-receiving output obtained from each segment that makes up the main light-receiving portion 21A, the front sub light-receiving portion 21B, and the rear sub light-receiving portion 21C of the DVD light-receiving area 21 based on a predetermined operation expression to obtain various signals, a main information signal, a focus error signal, and a tracking error signal or a tilt error signal may be obtained when recording/reproduction is performed for DVD.

On the other hand, since an operation is carried out for each light-receiving output obtained from each segment that makes up the main light-receiving portion 22A, the front sub light-receiving portion 22B, and the rear sub light-receiving portion 22C of the CD light-receiving area 22 based on a predetermined operation expression to obtain various signals, a main information signal, a focus error signal, and a tracking error signal may be obtained when recording/reproduction is performed for CD.

In the first laser light having the wavelength of 660 nm and the second laser light having the wavelength of 784 nm, the reflective film 8 of the beam splitter 7 and the reflective film 12 of the raising reflection mirror 11 generate phase differences, for example, as shown in a table of FIG. 4, respectively.

In the case of FIG. 4, the phase differences generated by the reflective film 12 of the reflection mirror 11 in the first laser light and the second laser light are set at 107.80 degrees and −124.26 degrees respectively so that each of the phase differences of the first laser light and the second laser light reaching the optical disc D becomes a quarter-wave (±90 degrees, however, positive and negative indicate rotating directions different from each other) with respect to the first laser light and the second laser light emitted from the first laser light source 2 and the second laser light source 3, respectively, based on the phase differences 17.80 degrees and 34.26 degrees of each of the first laser light and the second laser light generated by the reflective film 8 of the beam splitter 7.

That is, when the respective phase differences of the first laser light and the second laser light generated by the reflective film 8 of the beam splitter 7 are θ1 and θ2, and the phase differences generated by the reflective film 12 of the reflection mirror 11 in the first laser light and the second laser light are X1 and X2, respectively, the phase differences θ1 and θ2 generated by the reflective film 8 of the beam splitter 7 and the phase differences X1 and X2 generated by the reflective film 12 of the reflection mirror 11 are set so as to satisfy θ1+X1=±90 degrees and θ2+X2=±90 degrees. The above phase differences θ1 and θ2 and the phase differences X1 and X2 may have positive and negative values, and the positive and negative signs indicate that optical rotating directions of circular polarization are clockwise and counterclockwise.

As a result, the respective phase differences of the first laser light and the second laser light are combined with the phase difference generated by the reflective film 8 of the beam splitter 7 and the phase difference generated by the reflective film 12 of the reflection mirror 11 so as to become the quarter-wave, respectively.

Here, the reflective film 8 of the beam splitter 7 is formed with a film characteristic giving priority to its original function to distribute the reflected laser light amount and the transmitted laser light amount with a predetermined ratio of laser light amount to branch the laser light to each of optical paths in which the laser unit 1, the front monitor diode 10, and the photodetector 16 are arranged.

On the other hand, since the original function of the reflective film 12 of the reflection mirror 11 is a single function of a full-reflection mirror for refracting the optical axes of the first laser light and the second laser light, it is easier to give a desired function to the reflective film 12 so as to provide a desired phase difference with respect to the first laser light and the second laser light rather than to the reflective film 8 of the beam splitter 7.

As a specific example, a white plate glass (product name: B270 (by SCHOTT), for example) is used as a structural material of a base material of the reflection mirror 11, the film from the outermost surface to an intermediate layer of the reflective mirror 12 is made of a multi-layer film of Ti3O5 and SiO2, and arbitrary reflectivity and phase difference are given by designing the film thickness and the number of laminated layers of the reflective film 12.

Figure 5:
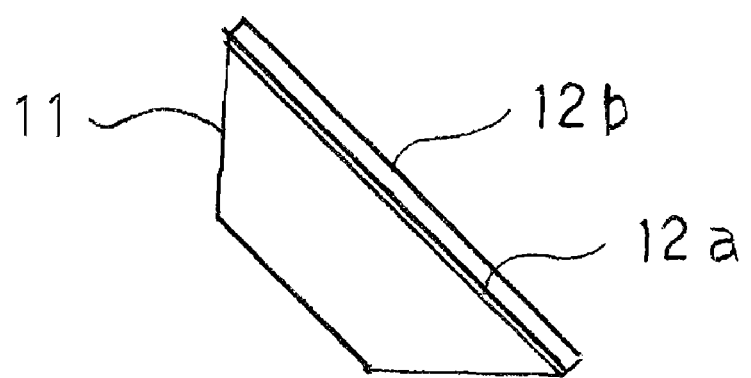
FIG. 5 is an explanatory diagram for explaining the reflective film of the raising reflection mirror.

FIG. 5 is an explanatory diagram for explaining a configuration of the reflective film 12 of the raising reflection mirror 11, the reflective film 12 is configured such that a reflection mirror functional film 12a is formed on an inclined face of the base material of the reflection mirror 11, and a phase difference functional film 12b is formed or bonded on top of the reflection mirror functional film 12a.

The reflection mirror functional film 12a and the phase difference functional film 12b of the reflective film 12 are formed by a thin-film manufacturing technique using, for example, a vacuum deposition method of a physical vapor deposition (PVD) method or a sputtering method, or are formed by a thin-film manufacturing technique using a chemical vapor deposition (CVD) method, with the use of a metal material such as aluminum, chromium, nickel chromium and the like suitable for the function of the reflection mirror and an organic material such as polycarbonate, polyvinyl alcohol, cyclic olefin polymer, norbornene, and liquid crystal coating type suitable for the phase difference function.

Moreover, as a method of forming the reflective film 12, there are also considered a thermal treatment method by applying an application-type phase difference plate material, and a bonding which bonds a phase difference film (quarter-wave plate film) onto a mirror surface of a base material surface of the reflection mirror 11.

Also, the reflective film 8 of the beam splitter 7 is formed by the vacuum deposition method of PVD or the sputtering method, for example, or by the CVD as well as the reflective film 12 of the raising reflection mirror 11.

The linear polarization directions of the first laser light and the second laser light incident to the beam splitter 7 are set at substantially 45 degrees with respect to the inclination direction of the reflection surface, which is the reflective film 8 surface of the beam splitter 7, by setting a rotating direction of the laser unit 1 in consideration of the rotating directions of the linear polarization directions of the first laser light and the second laser light by the half-wave plate 6, and also, longitudinal directions of the elliptic polarization of the first laser light and the second laser light incident to the raising reflection mirror 11 are set at substantially 45 degrees with respect to the inclination direction of the reflection surface, which is the reflective film 12 surface of the raising reflection mirror 11.

Also, the directions of the reflection surface of the beam splitter 7 and the reflection surface of the reflection mirror 11 are set so that the optical axis of the laser light incident to the beam splitter 7 and the optical axis of the laser light emitted from the reflection mirror 11 are substantially orthogonal to each other.

With an optical layout suitable for reducing the thickness by the positional relationship between the beam splitter 7 and the reflection mirror 11 as stated above, the first laser light and the second laser light are optically laid out such that the phase difference is efficiently generated in the reflective film 8 of the beam splitter 7 and the reflective film 12 of the reflection mirror 11.

In the above-mentioned embodiment, the example is shown in which the multi laser unit 1 compatible with two wavelengths is used, however, it may be configured so that a plurality of laser lights having different wavelengths are guided to a common optical path on the outward path to the optical disc and that each laser light arranged on the common path passes through a diffraction grating having a diffraction action. Alternatively, it may also be configured that each laser unit emitting the first laser light and the second laser light respectively is arranged in different optical paths using another beam splitter different from the beam splitter 7, the first laser light and the second laser light are guided to the common optical path in front of the beam splitter 7 on the outward path, and then guided to the beam splitter 7.

Moreover, when the optical pickup apparatus is compatible with three-wavelength laser light, a configuration using a multi laser unit compatible with three-wavelength can be employed as the multi laser unit 1.

The present invention is not limited to the optical pickup apparatus compatible with DVD and CD, and it is also possible to use an optical pickup apparatus compatible with a Blu-ray Disc (trademark) standard using laser light of 400 nm to 420 nm (405 nm, for example) in a blue-violet wavelength band.

The above embodiments of the present invention are simply for facilitating the understanding of the present invention and are not in anyway to be construed as limiting the present invention. The present invention may variously be changed or altered without departing from its spirit and encompass equivalents thereof.

What is claimed is:

1. An optical pickup apparatus comprising:
a laser light source configured to emit laser light having a predetermined wavelength;
an objective lens configured to apply the laser light to an optical recording medium;
a reflection mirror interposed in a optical path between the laser light source and the objective lens, the reflection mirror configured to reflect the laser light so that the laser light is allowed to be incident on the objective lens;
a photodetector configured to receive reflected light obtained by reflecting the laser light from the optical recording medium; and
a beam splitter interposed in a optical path between the laser light source and the reflection mirror, and arranged so that the laser light is reflected from the beam splitter in a direction of the reflection mirror, and the reflected light is allowed to pass through the beam splitter in a direction of the photodetector,
the beam splitter including a first reflective film configured to generate a first phase difference corresponding to the predetermined wavelength with respect to the laser light,
the reflection mirror including a second reflective film configured to generate a second phase difference that compensates for the first phase difference corresponding to the predetermined wavelength with respect to the laser light, so that a combined phase difference of the first phase difference and the second phase difference becomes substantially quarter-wave with respect to the laser light emitted from the laser light source.

2. The optical pickup apparatus according to claim 1, wherein
the laser light source includes a plurality of laser light sources configured to emit laser light having wavelengths different from each other, and wherein
a laser light source to emit laser light is chosen corresponding to the optical recording medium among the plurality of laser light sources.

3. The optical pickup apparatus according to claim 2, wherein
the plurality of laser light sources are incorporated in a single package of a multi laser unit.

4. The optical pickup apparatus according to claim 2, wherein
the reflection mirror is interposed in a common optical path between the plurality of laser light sources and the objective lens, and wherein
the beam splitter is interposed in a common optical path between the plurality of laser light sources and the reflection mirror.

5. The optical pickup apparatus according to claim 1, further comprising
a front monitor light-receiving detector configured to receive the laser light having passed through the beam splitter, and to generate a light-receiving output corresponding to a laser light amount of the laser light.

6. The optical pickup apparatus according to claim 1, wherein
directions of the beam splitter and the reflection mirror are set so that:
a linear polarization direction of the laser light incident on the beam splitter is substantially 45 degrees with respect to the surface of the first reflective film;
a longitudinal direction of elliptic polarization of the laser light incident on the reflection mirror is substantially 45 degrees with respect to the surface of the second reflective film; and
the optical axis of the laser light incident on the beam splitter is substantially orthogonal to the optical axis of the laser light emitted from the reflection mirror.

7. An optical pickup apparatus comprising:
a first laser light source configured to emit first laser light having a first wavelength;
a second laser light source configured to emit second laser light having a second wavelength different from the first wavelength;
an objective lens configured to apply the first laser light and the second laser light to an optical recording medium;
a reflection mirror interposed in a common optical path between the first laser light source as well as the second laser light source and the objective lens, the reflection mirror configured to reflect the first laser light and the second laser light so that the first laser light and the second laser light are allowed to be incident on the objective lens;
a photodetector configured to receive reflected light obtained by reflecting each of the first laser light and the second laser light from the optical recording medium; and
a beam splitter interposed in a common optical path between the first laser light source as well as the second laser light source and the reflection mirror, and arranged so that the first laser light and the second laser light are reflected from the beam splitter in a direction of the reflection mirror, and the reflected light is allowed to pass through the beam splitter in a direction of the photodetector,
the beam splitter including a first reflective film configured to generate a first phase difference corresponding to the first wavelength and the second wavelength with respect to each of the first laser light and the second laser light,
the reflection mirror including a second reflective film configured to generate a second phase difference corresponding to the first wavelength and the second wavelength with respect to each of the first laser light and the second laser light,
the first reflective film and the second reflective film being formed so that a combined phase difference of the first phase difference and the second phase difference becomes substantially quarter-wave with respect to each of the first laser light and the second laser light emitted from the first laser light source and the second laser light source.

8. An optical pickup apparatus comprising:
a plurality of laser light sources configured to emit laser light at respective wavelengths different from each other, wherein one of the plurality of laser light sources is selected to emit laser light corresponding to the optical recording medium;
an objective lens configured to apply the laser light to an optical recording medium;
a reflection mirror interposed in a optical path between the plurality of laser light sources and the objective lens, the reflection mirror configured to reflect the laser light so that the laser light is allowed to be incident on the objective lens;

a photodetector configured to receive reflected light obtained by reflecting the laser light from the optical recording medium; and a beam splitter interposed in an optical path between the plurality of laser light sources and the reflection mirror, and arranged so that the laser light is reflected from the beam splitter in the direction of the reflection mirror, and the reflected light is allowed to pass through the beam splitter in a direction of the photodetector, the beam splitter including a first reflective film configured to generate a first phase difference at a wavelength of the laser light, the reflection mirror including a second reflective film configured to generate a second phase difference at the wavelength of the laser light, the first reflective film and the second reflective film being formed so that a combined phase difference of the first phase difference and the second phase difference becomes substantially quarter-wave with respect to the laser light emitted from each of the plurality of laser light sources.

9. The optical pickup apparatus according to claim 8, wherein
the plurality of laser light sources are incorporated in a single package of a multi laser unit.

10. The optical pickup apparatus according to claim 8, further comprising
a front monitor light-receiving detector configured to receive the laser light having passed through the beam splitter, and to generate a light-receiving output corresponding to a laser light amount of the laser light.

11. The optical pickup apparatus according to claim 8, wherein
the second phase difference is set based on the first phase difference so that a combined phase difference of the first phase difference and the second phase difference becomes substantially quarter-wave with respect to the laser light emitted from each of a plurality of laser light sources.

12. The optical pickup apparatus according to claim 8, wherein
directions of the beam splitter and the reflection mirror are set so that:
a linear polarization direction of the laser light incident on the beam splitter is substantially 45 degrees with respect to the surface of the first reflective film;
a longitudinal direction of elliptic polarization of the laser light incident on the reflection mirror is substantially 45 degrees with respect to the surface of the second reflective film; and
the optical axis of the laser light incident on the beam splitter is substantially orthogonal to the optical axis of the laser light emitted from the reflection mirror.

13. The optical pickup apparatus according to claim 8, wherein
the plurality of laser light sources includes a first laser light source to emit laser light at a wavelength of 645 to 675 nanometers and a second laser light source to emit laser light at a wavelength of 765 to 805 nanometers.

14. The optical pickup apparatus according to claim 2, wherein
the plurality of laser light sources includes a first laser light source to emit laser light at a wavelength of 645 to 675 nanometers and a second laser light source to emit laser light at a wavelength of 765 to 805 nanometers.

15. The optical pickup apparatus according to claim 7, wherein
the first laser light source emits laser light at a wavelength of 645 to 675 nanometers and the second laser light source emits laser light at a wavelength of 765 to 805 nanometers.

* * * * *